(12) United States Patent
Green

(10) Patent No.: US 8,201,598 B2
(45) Date of Patent: Jun. 19, 2012

(54) CUTTING TOOL FOR USE WITH A STUMP CUTTING APPARATUS

(76) Inventor: Kevin J. Green, Blissfield, MI (US)

( * ) Notice: Subject to any disclaimer, the term of this patent is extended or adjusted under 35 U.S.C. 154(b) by 588 days.

(21) Appl. No.: 11/936,765

(22) Filed: Nov. 7, 2007

(65) Prior Publication Data

US 2008/0190519 A1 Aug. 14, 2008

Related U.S. Application Data

(63) Continuation-in-part of application No. 10/413,560, filed on Apr. 14, 2003, now Pat. No. 7,299,836, which is a continuation-in-part of application No. 09/909,776, filed on Jul. 19, 2001, now abandoned.

(60) Provisional application No. 60/219,299, filed on Jul. 19, 2000.

(51) Int. Cl.
*A01G 23/06* (2006.01)
*B27G 13/00* (2006.01)

(52) U.S. Cl. ..................... 144/24.12; 144/218; 144/241; 144/235

(58) Field of Classification Search ............... 144/24.12, 144/218, 233, 235, 230, 241; 407/33, 34, 407/40, 42, 46–48
See application file for complete search history.

(56) References Cited

U.S. PATENT DOCUMENTS

| | | | | |
|---|---|---|---|---|
| 5,205,199 A | * | 4/1993 | MacLennan | 83/839 |
| 5,497,815 A | * | 3/1996 | Bowling | 144/241 |
| 5,685,672 A | * | 11/1997 | Tjernstrom | 407/104 |
| 5,934,842 A | * | 8/1999 | Gupta | 407/40 |
| 6,024,143 A | * | 2/2000 | Ritchey | 144/24.12 |
| 6,138,725 A | * | 10/2000 | Leonardi et al. | 144/235 |
| 6,382,277 B1 | * | 5/2002 | Paumier et al. | 144/235 |
| 6,484,766 B1 | * | 11/2002 | Falatok et al. | 144/24.12 |
| 7,380,889 B2 | * | 6/2008 | Frear | 299/107 |
| 2005/0217756 A1 | * | 10/2005 | Cao | 144/241 |
| 2008/0149224 A1 | * | 6/2008 | Kappel et al. | 144/241 |

* cited by examiner

*Primary Examiner* — Shelley Self
(74) *Attorney, Agent, or Firm* — Burgess Law Office, PLLC

(57) ABSTRACT

A cutting tool for use with a stump cutting apparatus of the type utilizing a cutting wheel or drum rotating about a rotational axis wherein the cutting tool is removably attached to the cutting wheel or drum. The cutting tool includes a tool holder removably secured to the cutting wheel typically through a plurality of fasteners extending through a plurality of apertures located in the base portion of the tool holder. The tool holder includes a tool portion having a boss and a neck extending from the base portion of the tool holder to the boss. The boss being a generally annular member having an aperture extending between first and second ends wherein a cutting tool is secured within the aperture. The cutting tool generally includes a head portion, a shank and a cutting tip.

4 Claims, 6 Drawing Sheets

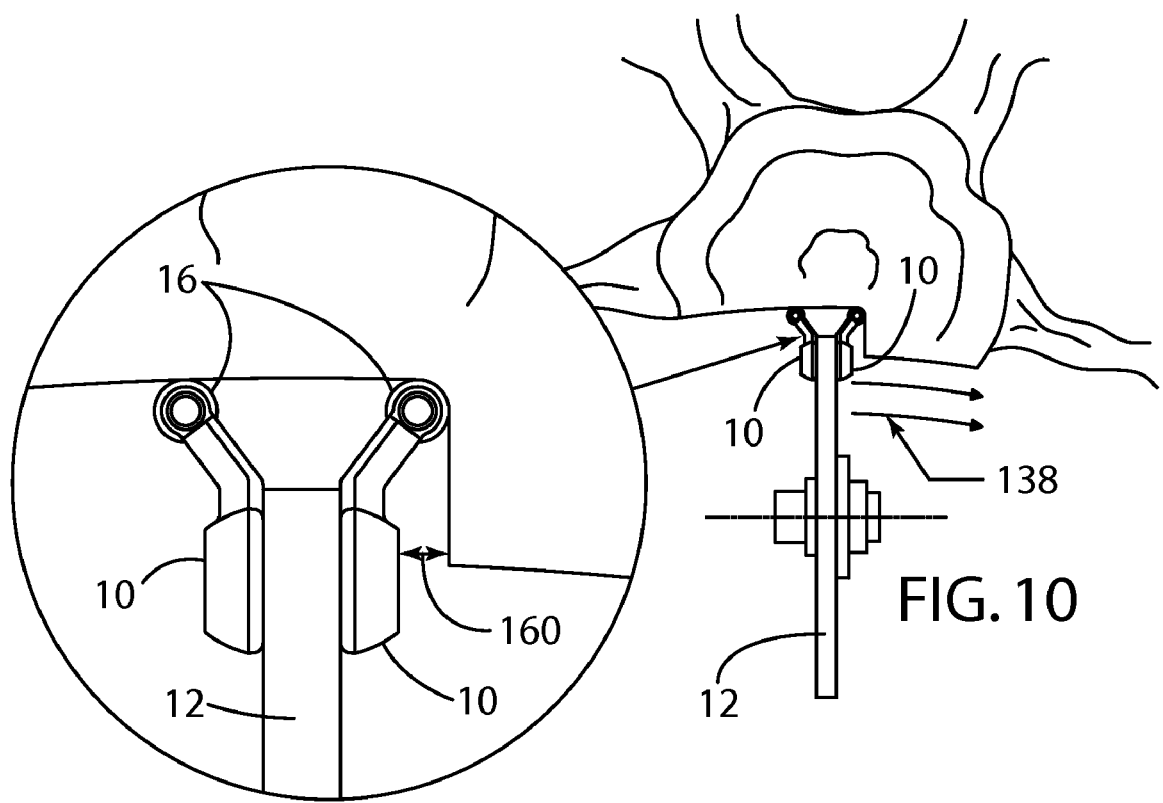

CUTTING TOOL FOR USE WITH A STUMP CUTTING APPARATUS

CROSS-REFERENCE TO RELATED APPLICATIONS

This application is a continuation-in-part of Ser. No. 10/413,560 filed Apr. 14, 2003, now U.S. Pat. No. 7,299,836, which is a continuation-in-part of Ser. No. 09/909,776 filed Jul. 19, 2001, now abandoned, which claims priority from Provisional application 60/219,299 filed Jul. 19, 2000. The entire specifications of which are expressly incorporated herein by reference.

BACKGROUND OF THE INVENTION

1. Field of the Invention

The present invention relates generally to a stump cutting apparatus and, more specifically to a cutting tool for use with a stump cutting apparatus.

2. Description of Related Art

Various types of stump cutting devices are known. A typical stump cutting apparatus includes a rotatable cutting wheel or drum having a plurality of cutting tools fastened circumferentially about the wheel or drum. Some stump cutting devices use a pair of pockets or mounting blocks attached across from each other on opposite sides of the cutting wheel. One of the pockets having at least one, and preferably a pair of, counterbored apertures, extending axially through the pocket. The other pocket having at least one, and preferably a pair of, threaded apertures extending axially through the pocket.

A fastener, such as a bolt or screw, extends through the counterbored aperture in the pocket, an aperture in the cutting wheel, and threadably engages the threaded aperture on the opposite pocket. Accordingly, when the fastener is tightened, it draws the pockets or tool holders together such that they sandwich the cutting wheel between them.

Typically, the pockets or mounting blocks both support and secure a cutting tooth to the cutting wheel. Depending upon the particular cutting tooth design or style a carbide cutting bit is attached to the cutting tooth. In many instances only a portion of the carbide cutting bit actually performs the cutting operation thus wasting the remaining portion or cutting edge of the carbide cutting bit.

Since stump cutting teeth typically operate in a harsh environment, replacement of the cutting teeth is or can be an almost continuous job. For example, contact with the ground surface rapidly dulls the cutting edge of each cutting tooth. In addition, when a cutting tooth strikes something hard such as a stone or rock the cutting bit or an edge thereof may break or chip requiring replacement of the cutting tooth. Finally, continuous loading of the cutting tooth can cause cutting tooth failure including twisting or bending of the shank portion. In some instances, the tooth itself may break thus necessitating replacement. Cutting tooth replacement is costly both in material replacement costs and associated man-hours necessary to remove and install each individual new cutting tooth. Further, depending upon the load applied to the cutting tool during the stump cutting operation, the fastener securing the mounting block or tool holder to the cutting wheel may break or shear.

One type of cutting tooth and tool holder/pocket assembly is disclosed in the U.S. Pat. No. 5,743,314 the disclosure of which is hereby incorporated by reference. As set forth therein, the '314 patent discloses a stump cutting tool assembly including a cutting tooth having an insert made of a solid material such as tungsten carbide and a generally cylindrical shank that extends through an aperture in a mounting block or pocket. As illustrated therein, a pair of fasteners, for example bolts, are used to secure the tool holder/pocket assembly and correspondingly the cutting tooth to a cutting wheel.

SUMMARY OF THE INVENTION

The present invention relates to a cutting tool for use with a stump cutting apparatus of the type utilizing a cutting wheel or drum rotating about a rotational axis wherein the cutting tool is attached to the cutting wheel or drum. The cutting tool includes a tool holder having a base portion and a head portion. The base portion includes an outer surface, an inner surface, and a side surface connecting the inner surface with the outer surface. First and second apertures are located in the base portion and extend between the inner surface and the outer surface. The cutting tool further includes a head portion including a boss and a neck extending between the base portion and the boss. The boss including a generally annular member having an outer diameter, wherein the outer diameter of the boss is greater then the thickness of the neck portion.

Another aspect of the invention includes a method for configuring the shape of the tool holder. Initially, a tool holder having at least one aperture extending therethrough is provided. The method includes selecting a particular fastener configuration, whereby the fastener extends through the aperture and secures the tool holder to the cutting wheel. Once the fastener configuration is selected, a cone of influence for the specific fastener selected is calculated. Cancellation of the cone of influence includes determining a first point corresponding with the outer surface of the tool holder and a second point corresponding with an inner surface of the tool holder. Once these points are calculated or determined, a line is extended between the points to determine the cone of influence such that it includes the area located between the line and the aperture in the tool holder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a schematic view of a cutting tool according to the present invention used in a stump cutting operation;

FIG. 11 is an enlarged view of a cutting tool according to the present invention used in a stump cutting operation.

DETAILED DESCRIPTION OF THE PREFERRED EMBODIMENTS

The following description of the preferred embodiment(s) is merely exemplary in nature and is in no way intended to limit the invention, its application, or uses.

Figure 1:
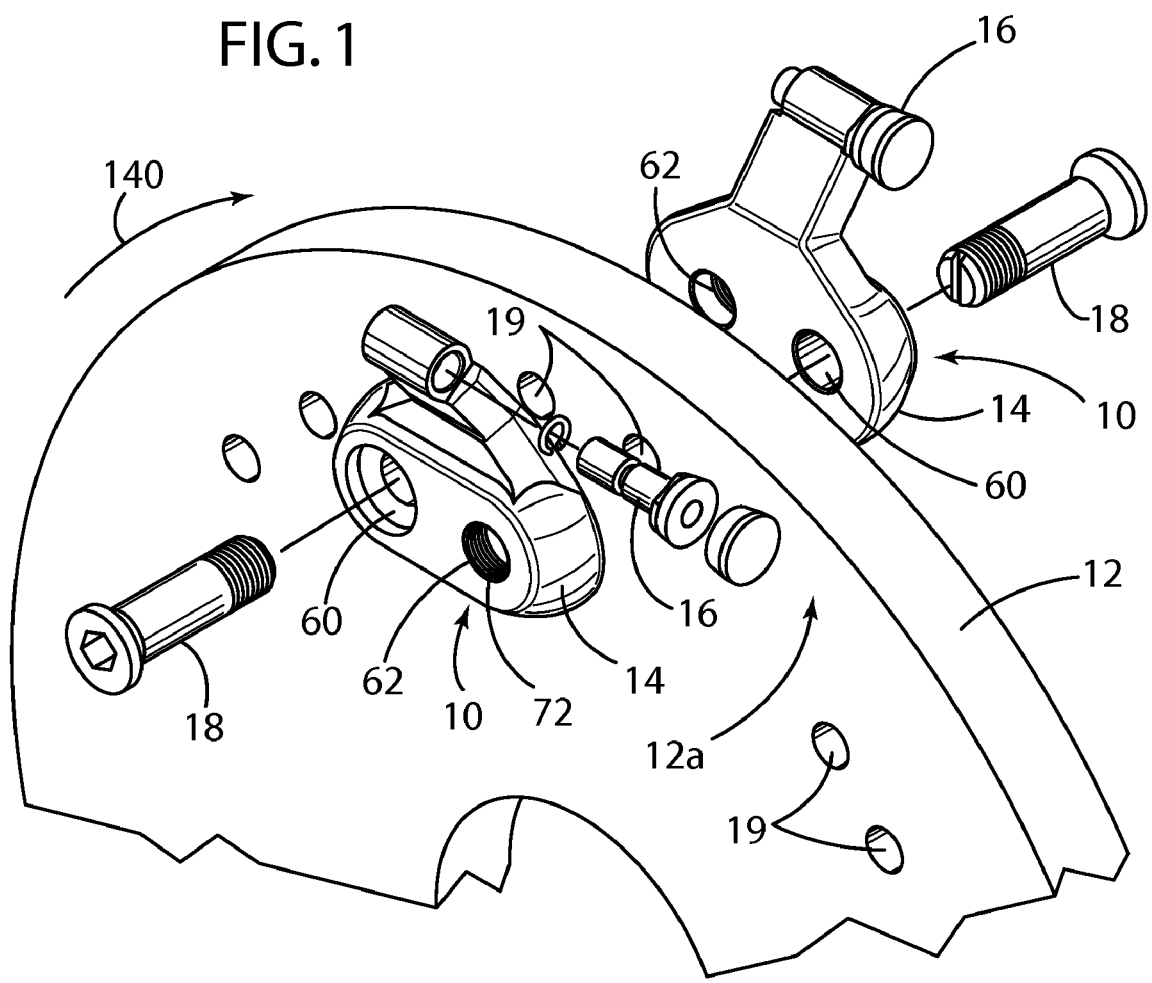
FIG. 1 is an exploded perspective view of a cutting tool according to the present invention for use with a cutting wheel of a stump cutting apparatus.
Figure 2:
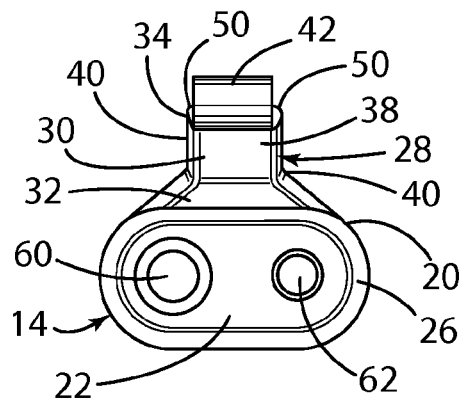
FIG. 2 is a front view of a tool holder according to one aspect of the present invention.
Figure 3A:
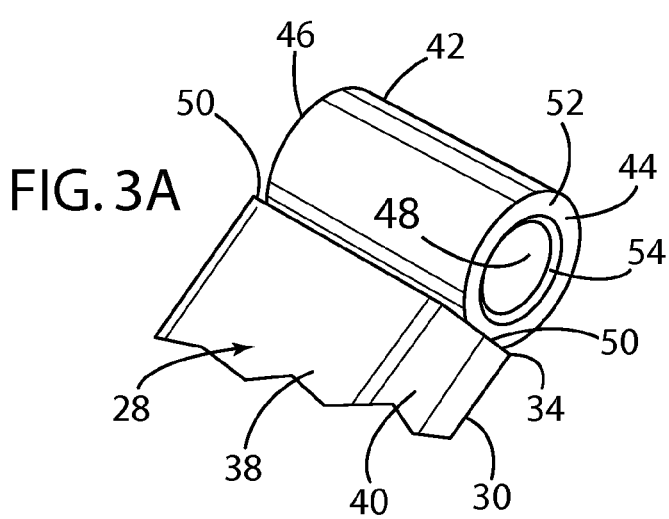
FIG. 3A is an enlarged perspective view of a boss of the tool holder according to the present invention.
Figure 3:
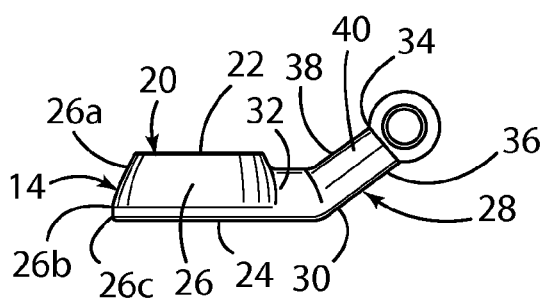
FIG. 3 is a side view of a tool holder according to one aspect of the present invention.
Figure 4:
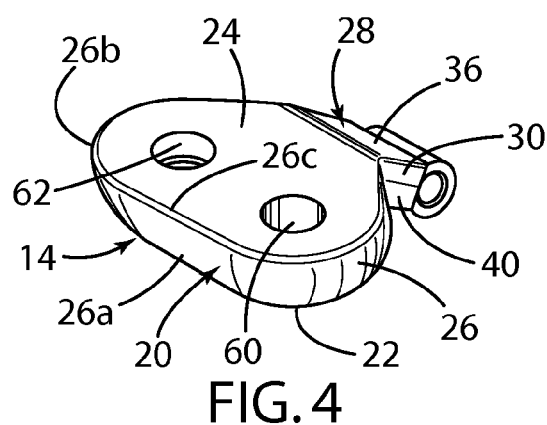
FIG. 4 is a rear perspective view of a tool holder according to the present invention.

FIG. 1 illustrates a pair of cutting tools, each one seen generally at 10, attached to a cutting wheel 12. Each cutting tool 10 includes a body, commonly referred to as a tool holder or mounting block 14 and a cutting tooth, seen generally at 16. In the disclosed embodiment, the cutting tooth 16 is removably secured to the tool holder 14. As illustrated, bolts or threaded fasteners 18 extend through one of the tool holders 14, through an aperture 19 in the cutting wheel 12 and are threadably received in the corresponding tool holder 14 to removably secure the respective tool holder 14 and corresponding cutting teeth 16 on opposite sides of the rotatably supported cutting wheel 12. The bolts or threaded fasteners 18 operate such that they draw the respective tool holders 14 together to sandwich the cutting wheel 12 between them, thereby securing the respective tool holders 14 to and supporting the cutting teeth 16 on the cutting wheel 12.

FIGS. 2-5 illustrate in greater detail the tool holder 14. The tool holder 14 includes a wheel or base portion 20 having a front or outer surface 22 and a rear or inner surface 24. The rear or inner surface 24 is the surface contacting the cutting wheel 12 when the tool holder 14 is attached to the cutting wheel 12. Side surfaces 26 interconnect the respective inner and outer surfaces 24, 22. In one embodiment, the respective outer and inner surfaces 22, 24 are generally planar, with the overall surface area of the outer surface 22 being less than that of inner surface 24 leading to the base portion 20 of the tool holder 14 having a generally trapezoidal cross-sectional configuration when viewed on a plane extending through the respective side surfaces 26, such as shown in FIG. 5A.

Since the inner surface 24 contacts the cutting wheel 12, and the outer surface 22 is spaced from the inner surface 24, the side surface 26 naturally extends outwardly away from the side surface 12a of the cutting wheel 12 and presents a surface that engages chips, debris or other material during the cutting operation. The configuration of the side surface 26 can control chip throwing or broadcasting. For example, the side surfaces of prior art tool holders or pockets often extend perpendicular to the side of the cutting wheel. Such tool holders tend to act like paddles and upon encountering chips or other debris generated during the stump cutting operation would direct them toward the stump cutting machine. Applicant's invention contemplates that the profile or configuration of the side surface 26 is such that a cross-section thereof may take a plurality of different configurations including angular, tapered, sloped, have a radius, be semi-circular or parabolic.

Figure 5:
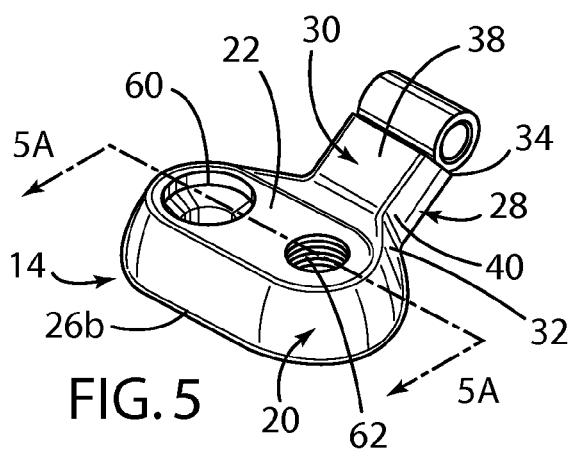
FIG. 5 is a front perspective view of a tool holder according to the present invention.
Figure 5A:
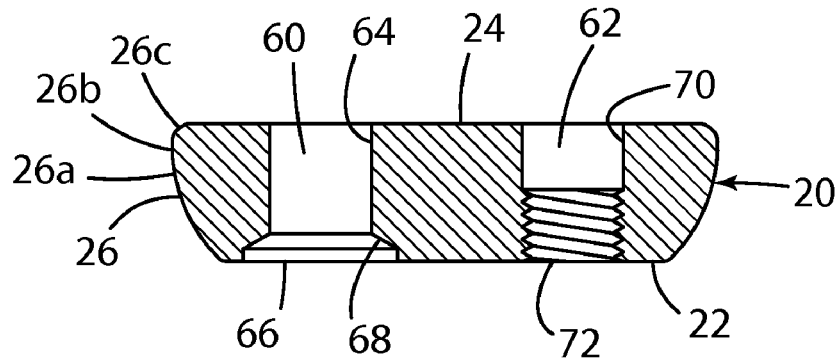
FIG. 5A is a cross-sectional view of the tool holder of FIG. 5 taken on line 5A-5A.

FIG. 5a illustrates the side surface 26 having a parabolic cross-section or curve 26a extending from the inner surface 24 to the outer surface 22. While the drawings illustrate that the curved portion 26a of the side surface 26 does not extend all the way to the inner surface 24 but instead terminates shortly before reaching the inner surface 24. This is due to manufacturing constraints. A forging process typically forms the tool holder 14. Thus, the side surface 26 includes is a small curved or relief portion 26c adjacent the inner surface 24, such that the high point or apex 26b of the curved side surface 26 is spaced from the inner surface 24. This small curved or relief portion 26c prevents mold lock in the forge, thereby enabling removal of the tool holder 14 from the forging die upon completion of the forging process. Accordingly, while the apex 26b of the side surface 26 is illustrated at a position spaced from the inner surface 24 of the wheel portion 20, applicant's invention, depending upon the particular manufacturing process used, contemplates forming the side surface 26 such that the apex 26b of the side surface 26 is located at the inner surface 24 and extends outwardly therefrom towards the outer surface 22. Accordingly, configuring the side surface 26 in such a manner reduces the energy or power needed to drive the respective tool holders 14 through the chip or debris pile. It also provides a mechanism for controlling the deflection, including the direction thereof, of chips or debris occurring as the tool holders 14 pass through the chip or debris pile.

As illustrated in FIG. 5a the side surface 26 has a parabolic cross-section or curve 26a. During the cutting operation, when the cutting wheel 12 is rotating, typically the chips or debris tend to strike the outer portion or half of the side surface 26. That is, the outer portion or half of the side surface 26 located near the outer surface 22 typically encounters more chips or debris than the inner portion or half of the side surface 26 that is located adjacent the cutting wheel 12. Accordingly, by configuring the side surface 26 to have a parabolic shape, the chips or debris striking the outer portion or half of the side surface 26 are directed in a more lateral or sideways direction rather than rearward; i.e., in the direction of a cutting wheel 12 rotation. In addition to making it easier to move the tool holders 14 through the chip or debris pile, it also reduces the amount of the chips or debris thrown or broadcast rearwardly. Configuring the side surface 26 in a parabolic manner as set forth above is one aspect of the present invention. The side surface 26 may also be formed of a plurality of other shapes or configurations including arcuate, straight or a combination thereof including complex curved surfaces. Whereby the side surface 26 is used to control the configuration of the side surface 26 extending outward from the cutting wheel 12 in a manner that in a whole makes it easier to move the tool holders 14 through the chip or debris pile or control the amount and direction of chips or debris thrown or broadcast during the cutting operation.

FIGS. 2-5 also illustrate the tool holder or mounting block 14 having a tool portion 28. The tool portion 28 includes a neck or support member 30 having a proximal end 32 connected to the wheel or base portion 20 and a distal end 34 located opposite the proximal end 32. Similar to the wheel or base portion 20, the neck 30 includes an inner surface 36 and an outer surface 38 along with opposing side surfaces 40 extending between the respective inner surface 36 and outer surface 38. While not required, as with the base portion 20 of the tool holder 14, the size or area of the outer surface 38 of the neck 30 can be less than the size or area of the inner surface 36 whereby the neck 30 has a cross-section having a generally trapezoidal configuration. As with the side surfaces 26 of the base portion 20, the side surfaces 40 of the neck 30 are also shown as arcuate surfaces and can be parabolic surfaces. Providing such a curvature or swept configuration for the respective edges or side surfaces 40 of the neck 30 also minimizes chip broadcasting. While the curvature is shown starting generally at the inner surface 36 of the neck 30, see FIG. 3, it is within the scope of the present invention to provide a side surface 40 having a slope, taper, curve or radius of curvature starting at the midpoint or center of the side surface 40 and extending back to both the inner and outer surface 36, 38. In addition to a curved or arcuate surface, the side surfaces 40 of the neck 30 may also be flat or planar and slope from a leading point, edge or surface on the neck 30 which is typically a leading edge, point or portion of the side surface 40. For example, each of the side surfaces 40 may include one or more surfaces that intersect at an edge or point.

Figure 9:
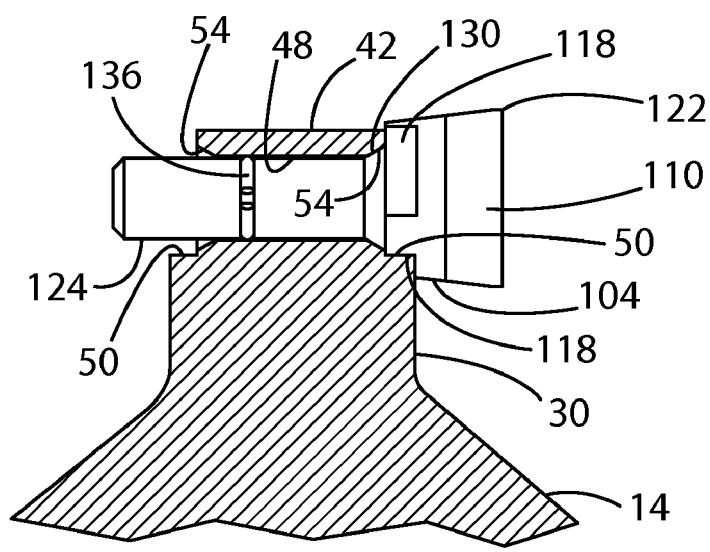
FIG. 9 is a partial cross-sectional view of the tool holder shown supporting a cutting tooth according to the present invention.

A boss 42 having a generally cylindrical configuration is located on the distal end 34 of the neck 30 and extends longitudinally between the respective opposing side surfaces 40. The boss 42 includes first and second ends 44, 46 with an aperture 48 extending longitudinally through the boss 42 between the first and second ends 44, 46. As illustrated herein, the boss 42 is a generally annular member having an inner diameter defined by the aperture 48 and an outer diameter. The outer diameter of the boss 42 is greater than the width or thickness of the neck 30, with the thickness defined as the distance between the inner surface 36 and outer surface 38. A pair of shoulders 50 are located on the neck 30 adjacent the first and second ends 44, 46 of the boss 42. The first and second ends 44, 46 have a generally planar or flat surface 52 with a chamfered portion 54 extending between the flat surface 52 and the aperture 48. As illustrated in FIG. 9, the chamfered portions 54 are located at both ends of the aperture 48. The aperture 48 may also include one or more circular grooves or channels located in the inner surface of the aperture 48. When only a single groove or channel is utilized, it is typically located at the midpoint of the aperture 48, that is between the respective first and second ends 44, 46 of the boss 42. When multiple grooves or channels are used, typically they are located at or near the each of the respective first and second ends 44, 46 of the boss 42.

The wheel or base portion 20 further includes first and second apertures 60, 62 extending through the wheel or base portion 20 from the front or outer surface 22 to the rear or inner surface 24. As illustrated in the drawings, the first aperture 60 includes a cylindrical bore 64 and a counterbore or counter sunk portion 66. The counter sunk portion 66 having a greater diameter than the cylindrical bore 64 and is sized to receive the head of a fastener 80. The countersunk portion 66 includes a beveled or chamfered engagement surface 68. The second aperture 62 is generally cylindrical and includes a non-threaded portion 70 and a threaded portion 72. As illustrated in FIG. 5a, the threaded portion or plurality of threads 72 located in the bore or aperture 62 terminates prior to reaching the inner surface or mounting face 24 of the base portion 20 of the tool holder 14. Accordingly, the non-threaded portion 70 extends inwardly from the inner surface 24 toward the plurality of threads or threaded portion 72. Spacing the threaded portion 72 from the inner surface 24 of the wheel or base portion 20 provides an opportunity to position the increased thickness or diameter of the non-threaded portion 88 of the fastener 80 at the interface or junction 82 between the wheel or base portion 20 of the tool holder 14 and the cutting wheel 12 and correspondingly take advantage of the fastener's 80 increased shear strength in the non-threaded portion 88. In addition, spacing the threaded portion 72 of the second aperture 62 from the inner surface 24 of the base portion 20 increases area or cone of influence of the fastener 80 since with a threaded joint; i.e. a joint using a threaded fastener engaging a plurality of threads on a corresponding part; the cone or area of influence is associated with a first plurality of threads of threaded portion 72. Thus, when the threaded fastener 80 is threadably received in the threaded portion 72 of the base portion 20 of the tool holder 14, the cone of influence depends on the distance the non-threaded portion 70 extends from the inner surface 24 of the base portion 20 of the tool holder 14. In addition, the length, or the amount of the second aperture 62 having threads, of the threaded portion 72 can be determined depending upon the minimum number of threads necessary to provide a secure engagement between the fastener 80 and the tool holder 14, with the remaining portion being the non-threaded portion 70. Designing the tool holder in this manner increases the cone or area of influence exerted by the fastener 80 through the tool holder 14 on the cutting wheel 12. It should be further understood that in some instances it may be desirable to provide a fully threaded second aperture 62 and this embodiment is within the scope of applicant's present invention.

A review of the drawings indicates that the same tool holder 14 can be used on both sides of the cutting wheel 12. Looking at FIG. 1, there the tool holder 14 is orientated such that the second aperture 62 having the threaded portion 72 is placed on the cutting wheel 12 wherein the second aperture 62 is located ahead of the first aperture 60 with respect to the direction of the cutting wheel 12 as indicated by the arrow 140. As illustrated, with respect to the second tool holder 14, by rotating the tool holder 14 180°; i.e. turning it such that the first aperture 60 having the countersunk portion 66 is placed on the opposite side of the cutting wheel 12 such that the fastener 80 extending through the first aperture 60 is threadably received in the second aperture 62 of the corresponding, opposite tool holder 14. Further, the first aperture 60 of the tool holder 14 on the near side of the cutting wheel 12, which is located behind the second aperture 62 with respect to the direction of rotation of the cutting wheel illustrated in FIG. 1 by the arrow 140, is aligned with the second aperture 62 of the tool holder 14 located on the far side of the cutting wheel 12. Accordingly, the fastener 80 extending through the first aperture 60 is threadably received in the second aperture 62 of the adjacent tool holder 14. While typically the tool holders are attached in identical pairs, the same tool holder configuration need not be used on the entire cutting wheel. For example, rather than being angled, the neck 30 may extend at other orientations with respect to the base portion 20 including lying in the same plane as the base portion 20.

Figure 6:
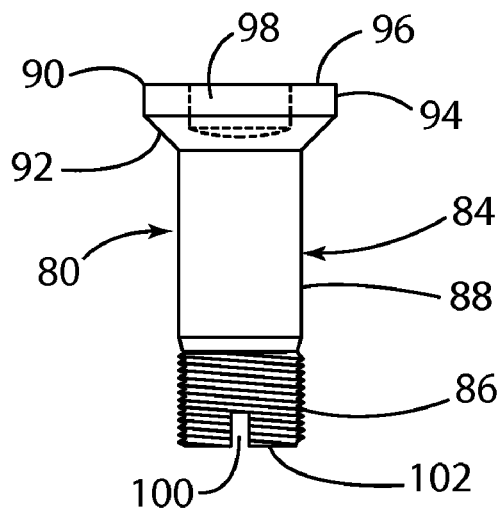
FIG. 6 is a side view of a fastener according to the present invention.

Turning to FIG. 6 there is shown a fastener 80 having a configuration suitable for use with the present invention. The fastener includes a shank 84 having a threaded portion 86 and a non-threaded portion 88. The fastener further includes a head 90 and an engagement surface 92. In the disclosed embodiment, the engagement surface 92 is a beveled surface that extends from the shank 84 to the outer circumferential surface 94 of the head 90. Accordingly, the engagement surface 92 of the fastener 80 is configured such that it is complementary to and thus mates with the beveled or chamfered engagement surface 68 of the counterbore 66. As illustrated, the engagement surface 92 extends almost to the top or upper surface 96 of the head 90. Thus, the head 90 has a minimal height, with the height being the distance between the end of the engagement surface 92 and the upper surface 96, illustrated as the outer circumferential surface 94. The fastener 80 typically includes a tool engagement aperture 98 extending inward into the head portion from the upper surface 96 of the head 90. The tool engagement aperture 98 is illustrated as having a hexagonal configuration suitable to receive a drive tool (not shown) commonly referred to as an Allen wrench. The tool engagement aperture 98 may have other configurations that are also known and could be used to drive or rotate the fastener 80, for example, a slot, a square, or Torx® configuration. One example of a suitable fastener 80 that can be used to secure the respective tool holders 14 to the cutting wheel 12 is a 5/8 inch diameter 82° flathead cap screw having a coarse thread configured to receive a hexagonal drive tool. Using such a fastener reduces the overall thickness of the tool holder 14; with the thickness being the distance between the inner and outer surfaces 24, 22 that the tool holder 14 extends from the surface of the cutting wheel 12, and correspondingly reduces the profile of the side surface 40 of the tool holder 14. Reducing the thickness of the tool holder 14 reduces the distance that the cutting tooth 16 is mounted or spaced from the cutting wheel 12.

The beveled engagement surface 68 also limits the use of square corners typically found in prior art pockets when using a standard screw having a cylindrical head and a load bearing surface extending perpendicular to the longitudinal axis of the screw and a pocket having a counterbored portion having a load surface extending perpendicular to the aperture. Limiting the square corners reduces the opportunity for fractures to occur at the corners due to stress. In addition, the beveled engagement surface 92 of the fastener 80 and the corresponding beveled engagement surface 68 of the aperture 60 cooperate to increase the contact area between the fastener 80 and the tool holder 14. Increasing the contact area between the respective fastener 80 and tool holder 14 reduces the potential for self-loosening of the fastener 80 during operation of the stump cutting apparatus.

Figure 12:
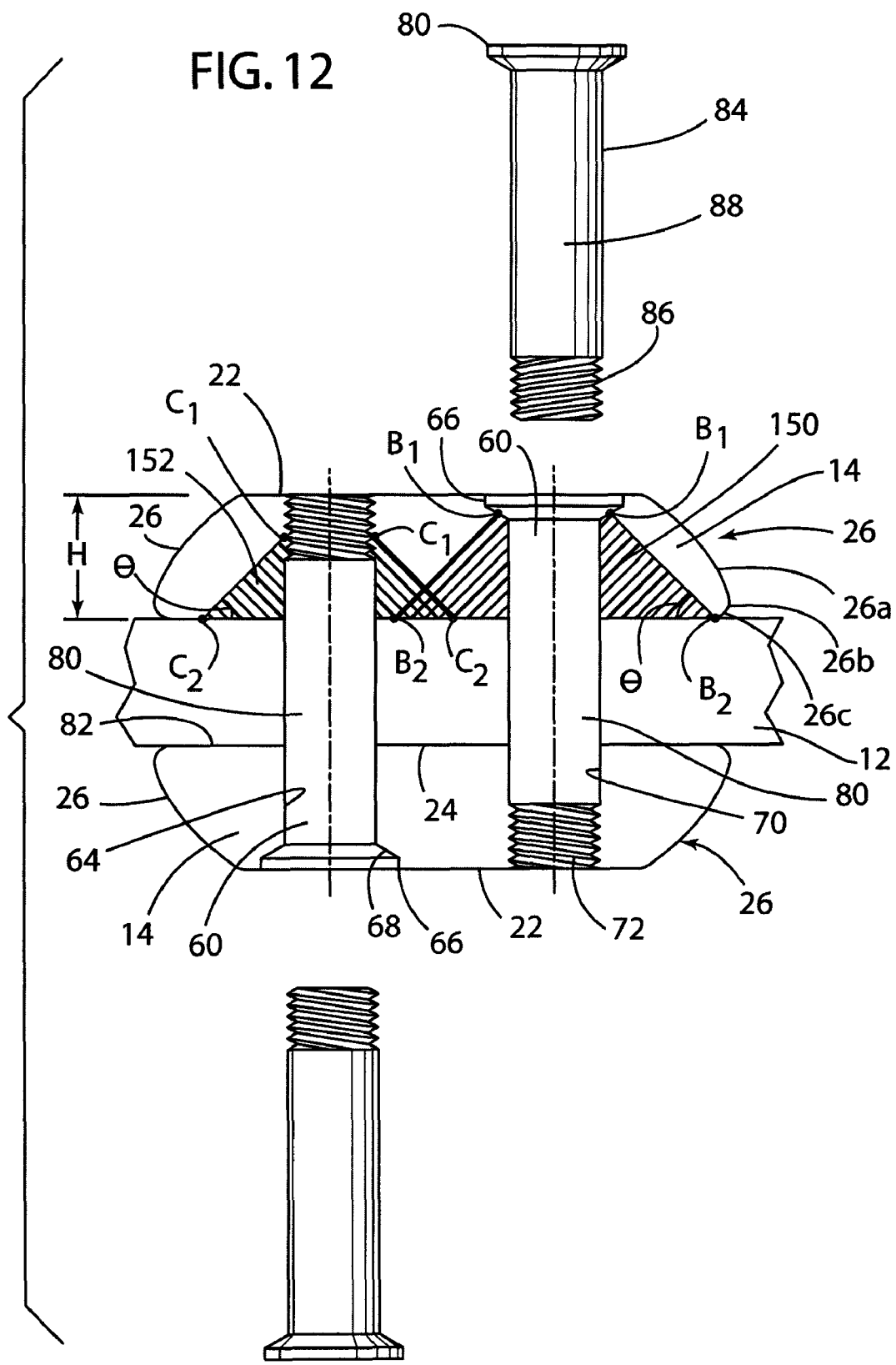
FIG. 12 is a cross-sectional view of a pair of tool holders according to the present invention shown adjacent to a cutting wheel with the fasteners removed for clarity.

Turning to FIG. 12, there is illustrated an example of a pair of tool holders 14 attached to the cutting wheel 12 using fasteners 80. The following description is merely an example of one embodiment of the present invention and is given to provide an illustration of one method used to design a cutting tool according to the present invention and should not be construed as limiting the scope of applicant's invention. FIG. 12 is a cross-section taken through the tool holders 14 attached to a cutting wheel 12 along a plane extending through a pair of apertures located in the cutting wheel 12. The fasteners 80 are shown spaced from the respective tool holders 14 for the purposes of clarity. The shaded areas in the tool holders 14 represent a schematic approximation of the cone of influence of the clamping force generated by the fasteners 80 when fully engaged and tightened. Applicant's invention, contemplates and determines the cone of influence and uses it in part to configure the shape of the tool holder 14. Since the tool holders 14 are identical, the following description applies to one of the tool holders 14 and it should be understood that it would apply to the corresponding tool holder 14 reversed and placed on the opposite side of the cutting wheel 12. Turning first to the non-threaded aperture 60 having the counterbore 66, the cone of influence 150 of the fastener 80 extends at an angle θ, wherein θ=45°, from point $B_1$ to $B_2$. Thus, the material of the tool holder 14 located outside of the cone of influence 150 is not utilized to transfer the clamping force from the fastener 80. Accordingly, that portion of the tool holder 14 located outside of a line extending between points $B_1$-$B_2$, that is outside of the cone of influence 150, can be shaped or configured as desired without affecting cone of influence 150 generated by the clamping force of the fastener 80.

Turning to the second aperture 62, the cone of influence 152 starts generally at the second thread of the threaded portion 72 located inward from the non-threaded portion 70. The cone of influence 152 extends from the second thread or point C1 along a line to point C2, with the line extending at an angle θ, wherein θ=45°. Accordingly, the cone of influence 152 for the second aperture 62 is illustrated by the shaded area. As shown, the non-threaded portion 70 extends from the inner surface 24 towards the threaded portion 72. Thus, extending the length of the non-threaded portion 70 moves the second thread or point C2 further away from the inner surface 24 thus increasing the area encompassed by the cone of influence 152. Thus, use of a fastener 80 having a threaded portion 86 equal to the threaded portion 72 of the base portion 20, the non-threaded portion 88 of the fastener 80 will extend across the interface 82 between the cutting wheel 12 and inner surface 24 of the tool holder 14.

The locations of points $B_1$ and $B_2$ can be determined as follows, point $B_1$ is located on the tool holder 14 at a distance equal to $(0.5)(\gamma)(D)$ from the center of the fastener 80; wherein γ=the contact radii ratio which is 1.5 for standard hex head bolts and is used herein as an estimate for a flat head cap screw as disclosed herein and D=nominal fastener size. Point $B_2$ is located on inner surface 24 of the tool holder 14 at a distance equal to $[(0.5)(\gamma)(D)+H]$ wherein H=tool holder thickness. Applying these equations to a numerical example, to determine the locations of points B1 and B2 for a 5/8 inch flathead cap screw with γ=1.5 and a 3/4" thick tool holder, point B1 would then be located at (0.5)(1.5)(5/8")=0.47" from the center of the 5/8 inch flathead cap screw and point B2 would be located at a distance equal to [0.47"+0.75"]=1.2" from the center of the 5/8 inch flathead cap screw. Note the location of point B1 remains the same for all thicknesses of the tool holder 14 while the location of point B2 varies with respect to the thickness of the tool holder 14.

Turning to the cone of influence 152 for the second aperture 62 having the threaded portion 72, the cone of influence 152 extends from points C1 to C2. As set forth previously, the cone of influence 152 starts from the second thread (point C1) of the threaded portion 72. Accordingly, given that the cone of influence 152 extends at a 45° angle, point C2 would be located at a distance equal to $[(0.5)(D)+L+(2)(1/Th)]$ wherein D=nominal fastener size, L=the length of the non-threaded portion 70 and Th=the number of threads per inch. Accordingly, for a 5/8 inch flathead cap screw having a coarse thread equaling 11 threads per inch and a non-threaded portion=1/8", point C2 would be located at a distance equal to [(0.5)(5/8)+1/8+(2)(1/11)]=0.62 inches. It should be understood that increasing the length (L) of the non-threaded portion would also increase the distance that point C2 is located from the fastener centerline. Depending upon the thickness of the tool holder 14 a certain number of threads must remain in the threaded portion 72 to ensure that the fastener 80 remains securely connected to the tool holder 14 and prevent threads of the threaded portion 72 from stripping. A general rule of thumb for the amount of threads needed in the threaded portion 72 is anywhere from up to three threads to a threaded length equal to that of the diameter of the fastener. Depending upon the particular materials used, computer programs are available that can be used to calculate the length (L) needed.

As illustrated in FIG. 12 the cone of influence 150, 152 of each of the first and second apertures 60, 62 may overlap as is the case in the instant example when the spacing between the respective center lines of the apertures 60, 62 is 1.5 inches. Thus the clamping force generated by the fasteners 80 is spread over the cone of influence 150, 152 whereby material outside of the cone of influence 150, 152 can be removed or shaped without affecting the overall load transfer of the fastener 80 to the cutting wheel 12. Spreading the clamping force over a greater area reduces the possibility that the base portion 20 of the tool holder 14 indents or deforms the cutting wheel 12 during operation. It also reduces the stress on the base portion 20 and the potential for damage to the base portion 20 during operation of the stump cutting assembly. Deformation of either the tool holder 14 or the cutting wheel 12 can cause loosening of the fastener 80 resulting in a loss of clamping force. Loss of the clamping force results in a loss of the frictional force between the respective tool holder 14 in the cutting wheel 12 wherein the load occurring during the cutting operation is transferred to the non-threaded portion 88 of the shank 84. Transferring the load to the shank 84 of the fastener 80 may result in fastener 80 failure due to the shear forces occurring at the tool holder 14 and a cutting wheel 12 interface 82.

Accordingly, due to the symmetry of the tool holder 14 and the ability to use the same tool holder 14 on both sides of the cutting wheel 12 the line extending between points B1, B2 typically controls the configuration of the profile of the side surface 40. In addition, while the area contained under the cone of influence 150, 152 can be used to determine the configuration of the tool holder 14, the invention contemplates a configuration depending upon the overall design, wherein an amount of the outer peripheral area of the tool holder 14 contained within the cone of influence 150 may be removed. Specifically, point B2 may lie outside of the side surface 40.

In addition, the fastener 80 is shown with a slot 100 in the end 102 thereof adjacent the threaded portion 86. The slot 100 can be used to remove the threaded portion 86 of the fastener 80 from the tool holder 14 if the fastener 80 should fracture during the cutting operation and remain lodged in the tool holder 14.

Figure 7:
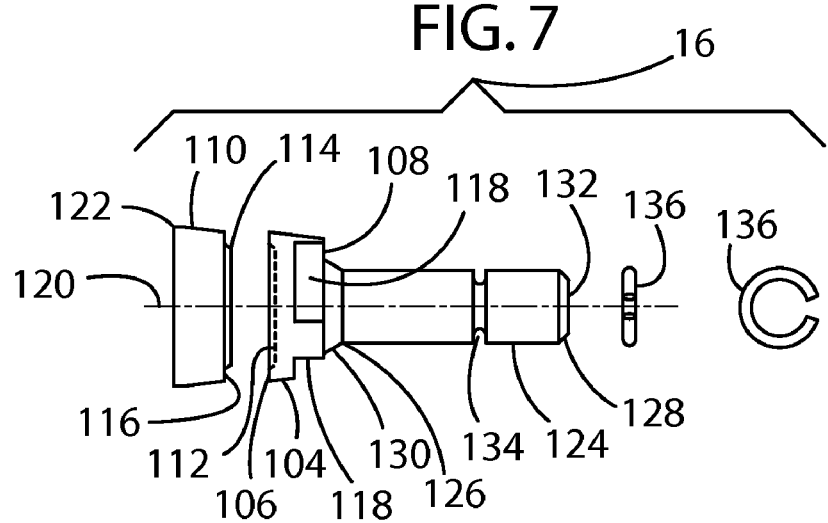
FIG. 7 is an exploded side view of a cutting tooth according to the present invention.
Figure 8:
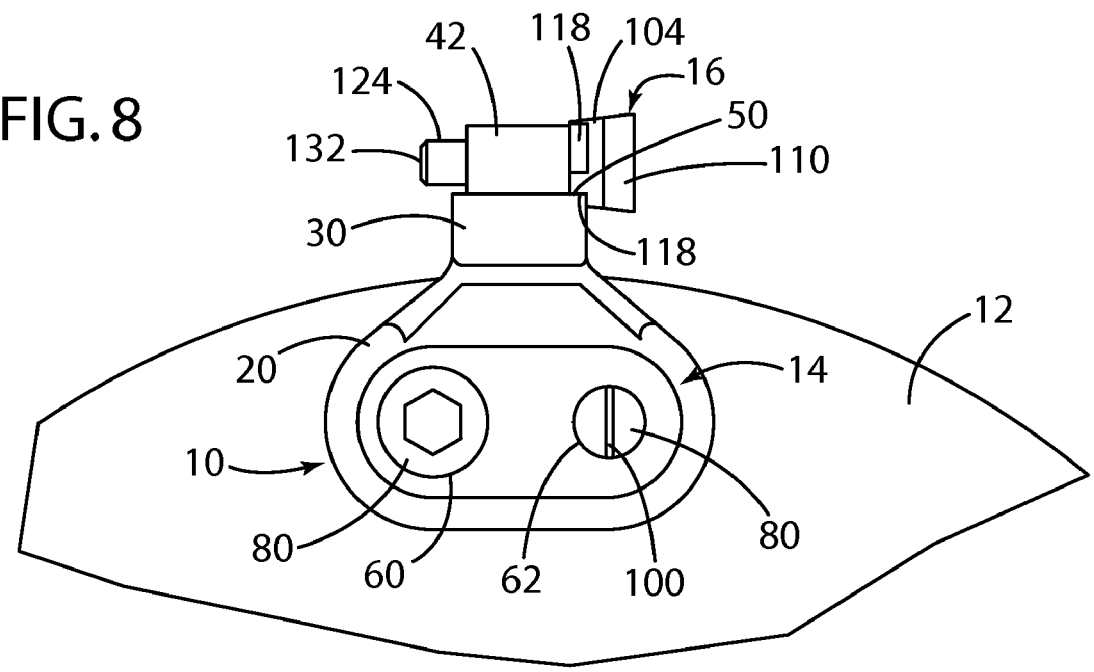
FIG. 8 is a side view of a cutting tool according to the present invention secured to a cutting wheel.

FIG. 7 illustrates the cutting tooth 16 in further detail. The cutting tooth 16 includes a head 104 having a front surface 106 and a rear surface 108. A cutting tip 110 is attached to the front surface 106 of the head 104. The cutting tip 110 is generally cylindrical in shape and the front surface thereof has a generally concave shape which terminates prior to the periphery of the cutting tip 110. The front surface 106 of the head 104 may include a shallow depression or indentation 112 sized to receive a corresponding projection 114 extending outward from the rear surface 116 of the cutting tip 110. The complementary indentation 112 and projection 114 are such that the projection 114 functions to properly locate and orient the cutting tip 110, typically made of a hard material such as carbide, on the head 104 prior to attaching the cutting tip 110 to the head 104 through one of several known processes including brazing. As illustrated in the drawings, the head 104 has a generally cylindrical shape that tapers rearwardly from the front surface 106 toward the rear surface 108. A plurality of planar indentations or flats 118 are located about the outer circumferential surface of the head 104. As illustrated in the disclosed embodiment, the planar indentations 118 are spaced from one another a predetermined amount, illustrated herein as 120°. When the planar indentations 118 located on the head 104 matingly engage the planar or flat surface of the shoulder 50 located on the neck 30 they cooperate with the shoulder 50 to resist rotation of a cutting tool 16 about its longitudinal axis 120. The multiple planar indentations 118 located on the head 104 of the cutting tooth 16 make the cutting tooth 16 indexable. Specifically, after disengaging one of the planar indentations 118 from the shoulder 50 the cutting tooth 16 can be rotated or indexed such that an adjacent indentation 118 on the head 104 engages the shoulder 50 located on the neck 30. Accordingly, indexing the cutting tooth 16 in this manner exposes a new portion of the outer peripheral or cutting edge 122 of the cutting tip 110. Thus, the planar indentations 118 and shoulder 50 cooperate to secure the orientation of the cutting tooth 16 with respect to its longitudinal axis 120 while enabling a new portion of the cutting edge 122 to be exposed thereby providing a means to more efficiently use the entire portion of the cutting tip 110 and corresponding cutting edge 122. While the indentations are disclosed herein as being planar, they may also have other configurations including arcuate or angular projections provided that the shoulder located on the tool portion of the tool holder has a complementary configuration and cooperates with the configuration on the cutting tooth to prevent rotation of the cutting tooth about its longitudinal axis.

The cutting tooth 16 further includes a shank 124. The shank 124 has a proximal end 126 and a distal end 128 with the proximal end 126 attached to the rear surface 108 of the head 104. A fillet 130 extends between the rear surface 108 of the head 104 and the outer periphery of the shank 124. The fillet 130 is a chamfered surface extending between the respective rear surface 108 of the head 104 and the shank 124 and operates to reduce the stress concentration at the joint between the head 104 and the shank 124. As illustrated, the shank 124 is a generally cylindrical member. The distal end 128 of the shank 124 includes a generally flat or planar surface 132. An annular recess 134 located on the outer peripheral surface of the shank 124 is sized to receive a split ring 136. The split ring 136 is a expandable type member that when compressed generates a radial force. While shown herein with a circular cross-section, the split ring 136 can have different cross-sections including square, oval, hex or other shapes.

Accordingly, the cutting tooth 16 is installed or positioned in the aperture 48 located in the tool or head portion 28 by inserting the distal end 128 of the shank 124 in the aperture 48. Thereafter sliding the shank 124 into the aperture 48 until the split ring 136 engages the chamfered portion 54 of the boss 42 located adjacent the aperture 48. The chamfered portion 54 acts as a lead-in surface whereby the chamfered portion 54 helps to compress the split ring 136 and guide it into the aperture 48 upon application of a suitable force to the cutting tooth 16 at the cutting tip 110 end thereof. Once the split ring 136 is located in the aperture 48, the cutting tooth 16 is further inserted into the aperture 48 and is rotated as necessary to line up one of the flats 118 located on the head 104 of the cutting tooth 16 with the shoulder 50. Once properly aligned, the cutting tooth 16 is fully inserted until the selected flat 118 is adjacent the shoulder 50 with the rear surface 108 of the head 104 placed adjacent the flat surface 52 located adjacent the aperture 48. In addition, the fillet 130 is situated or lies adjacent and is supported by the chamfered portion 54. Accordingly, the outward radial force exerted by the compressed split ring 136 retains the cutting tooth 16 in the aperture 48. In one embodiment of the present invention, the distal end 128 of the shank 124 extends outwardly past the rear or second end 46 when the head 104 of the cutting tooth 16 is placed adjacent the first or front end 44 of the boss 42.

In order to index the cutting tooth 16, applying a force to the distal end 128 of the shank 124, for example by tapping on the distal end 128 with a hammer or mallet, moves the cutting tooth 16 longitudinally in the aperture 48 and correspondingly disengages the flat 118 from the shoulder 50. Once disengaged the cutting tooth 16, specifically the shank 124 rotates freely within the aperture 48 and split ring 136 that remains in the aperture 48. Accordingly, the cutting tooth 16 can be rotated about its longitudinal axis 120 until a different flat 118 is placed adjacent the shoulder 50. The cutting tooth 16 is then reinserted by driving it in the opposite direction until the newly selected flat 118 is placed adjacent the shoulder 50. This system allows the cutting tooth 16 to be easily and efficiently indexed between various positions without removing the cutting tooth 16 from the aperture 48 and correspondingly it remains connected to the tool holder 14. When necessary, the cutting tooth 16 can be fully removed from the tool holder 14 by inserting a tool having a diameter lesser than that of the aperture 48 in the boss 42. The cutting tooth 16 is then driven out of the aperture 48 by applying a suitable force to the flat surface 132 of the distal end 128 of the shank 124.

As set forth previously, an additional embodiment of the present invention contemplates an annular groove or channel located in the inner surface of the aperture 48. The annular groove or channel would receive the split ring 136 when the cutting tooth 16 is fully inserted into the aperture 48 with one of the flats 118 located adjacent the shoulder 50.

As illustrated in FIGS. 10-11 the low profile configuration of the tool holder 14 provides greater clearance 160 between the workpiece, i.e., the stump, and the outer surface 38 of the tool holder 14. Accordingly, as illustrated in FIG. 10, when the cutting wheel 12 cuts in the direction illustrated by the arrows 138.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cutting tool for use with a stump cutting apparatus of the type utilizing a cutting wheel or drum rotating about a rotational axis, wherein the cutting tool is attached to the cutting wheel or drum, the cutting tool comprising:
    a tool holder, said tool holder having a base portion and a head portion;
    said base portion having an inner surface, an outer surface and a side surface connecting said inner surface with said outer surface, said inner and outer surfaces defining a thickness of said base portion;
    said base portion having first and second apertures extending between said inner surface and said outer surface;
    said head portion having a boss, said boss having first and second ends and an aperture extending between said first and second ends and said head portion includes a neck, said neck having a proximal end connected to said base portion and a distal end connected to said boss, said neck having an inner surface and outer surface with a side surface extending between said inner surface and said outer surface;
    said inner and outer surfaces defining a thickness of said neck whereby said thickness is less than the thickness of said base portion;
    said boss includes a generally annular member extending between said first and second ends of said boss, said generally annular member having an inner diameter and an outer diameter; said outer diameter being greater than the thickness of said neck portion; and
    said head portion having first and second shoulders located adjacent said first and second ends of said head portion.

2. A cutting tool for use with a stump cutting apparatus as set forth in claim 1 wherein said inner surface of said base portion has a surface area and said outer surface of said base portion has a surface area and said surface area of said outer surface of said base portion is less than said surface area of said inner surface of said base portion whereby a said base portion of said tool holder has a substantially trapezoidal shaped cross-section when viewed in a plane extending through said first and second apertures.

3. A cutting tool for use with a stump cutting apparatus as set forth in claim 1 wherein said side surface is a generally paraboloidal surface.

4. A cutting tool for use with a stump cutting apparatus as set forth in claim 1 wherein said tool holder is symmetrical about a plane parallel to the centerlines of the first and second apertures located in said base portion when said plane is located at the midpoint of and perpendicular to a plane passing through the respective center lines of said first and second apertures.

* * * * *